(12) United States Patent
De Lagrange et al.

(10) Patent No.: US 12,143,594 B2
(45) Date of Patent: Nov. 12, 2024

(54) LUMA TO CHROMA QUANTIZATION PARAMETER TABLE SIGNALING

(71) Applicant: INTERDIGITAL CE PATENT HOLDINGS, SAS, Paris (FR)

(72) Inventors: Philippe De Lagrange, Betton (FR); Edouard Francois, Bourg des Comptes (FR); Franck Hiron, Chateaubourg (FR); Christophe Chevance, Brece (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 237 days.

(21) Appl. No.: 17/626,294

(22) PCT Filed: Jul. 9, 2020

(86) PCT No.: PCT/EP2020/069407
§ 371 (c)(1),
(2) Date: Jan. 11, 2022

(87) PCT Pub. No.: WO2021/009004
PCT Pub. Date: Jan. 21, 2021

(65) Prior Publication Data
US 2022/0272356 A1    Aug. 25, 2022

(30) Foreign Application Priority Data

Jul. 12, 2019 (EP) .................................... 19305938
Sep. 18, 2019 (EP) .................................... 19306122

(51) Int. Cl.
*H04N 19/176* (2014.01)
*H04N 19/136* (2014.01)
(Continued)

(52) U.S. Cl.
CPC ......... *H04N 19/149* (2014.11); *H04N 19/136* (2014.11); *H04N 19/176* (2014.11); *H04N 19/186* (2014.11)

(58) Field of Classification Search
CPC .... H04N 19/70; H04N 19/124; H04N 19/149; H04N 19/136; H04N 19/176; H04N 19/186
See application file for complete search history.

(56) References Cited

U.S. PATENT DOCUMENTS 9,313,526 B2 * 4/2016 Bivolarsky ............ H04N 19/46
11,146,823 B2 * 10/2021 Ramasubramonian ......................
H04N 19/126
(Continued)

FOREIGN PATENT DOCUMENTS

CN    104584559 A    4/2015
EP    3425911 A1    1/2019

OTHER PUBLICATIONS

Ramasubramonian et al., "AHG15: On signalling of chroma QP tables", Joint Video Experts Team (JVET) of ITU-T SG 16 WP 3 and ISO/IEC JTC 1/SC 29/WG 11, Document: JVET-O0650-v2, 15th Meeting: Gothenburg, Sweden, Jul. 3, 2019, 4 pages.
(Continued)

*Primary Examiner* — Sath V Perungavoor
*Assistant Examiner* — Paramita Ghosh
(74) *Attorney, Agent, or Firm* — Condo Roccia Koptiw LLP (57) ABSTRACT

Compression technology comprises deriving chroma quantization parameter (Qpc) based on luma Qp using luma-to-chroma Qp mapping table. Such a table may be shared by the encoder and the decoder. However, in some cases, signaling such a table in the data stream instead of having it fixed by a standard may be advantageous. The syntax used to encode, signal and decode this table has a cost in terms of bitrate.
(Continued)

| qPi | < 30 | 30 | 31 | 32 | 33 | 34 | 35 | 36 | 37 | 38 | 39 | 40 | 41 | 42 | 43 | > 43 |
|---|---|---|---|---|---|---|---|---|---|---|---|---|---|---|---|---|
| $Qp_c$ | = qPi | 29 | 30 | 31 | 32 | 33 | 33 | 34 | 34 | 35 | 35 | 36 | 36 | 37 | 37 | = qPi − 6 |

The present principles propose to signaling of a luma-to-chroma mapping table in the data stream according to different embodiments.

14 Claims, 3 Drawing Sheets

(51) Int. Cl.
*H04N 19/149* (2014.01)
*H04N 19/186* (2014.01)

(56) References Cited

U.S. PATENT DOCUMENTS

| | | | |
|---|---|---|---|
| 2014/0003497 A1 | 1/2014 | Sullivan et al. | |
| 2022/0070462 A1* | 3/2022 | Ikonin | H04N 19/172 |

OTHER PUBLICATIONS

Bross et al., "Versatile Video Coding (Draft 6)", Joint Video Experts Team (JVET) of ITU-T SG 16 WP 3 and ISO/IEC JTC 1/SC 29/WG 11, Document: JVET-O2001-vE, 15th Meeting, Gothenburg, Sweden, Jul. 3, 2019, 455 pages.

Ikonin et al., "AHG15: Signalling of chroma Qp mapping table", Joint Video Experts Team (JVET) of ITU-T SG 16 WP3 and ISO/IEC JTC 1/SC 29/WG 11, Document: JVET-O0186-v2, 15 Meeting, Gothenburg, Sweden, Jul. 3, 2019, 12 pages.

Ramasubramonian et al., "AHG15: On signalling of chroma QP tables". Joint Video Experts Team (JVET) of ITU-T SG 16 WP 3 and ISO/IEC JTC 1/SC 29/WG 11, Document: JVET-O0650-v1, 15th Meeting: Gothenburg, Sweden, Jul. 3, 2019, 4 pages.

Bossen et al., "AHG15: Efficient encoding of chroma QP tables using piecewise linear representations", Joint Video Experts Team (JVET) of ITU-T SG 16 WP 3 and ISO/IEC JTC 1/SC 29/WG 11, Document: JVET-O1166-v3, 15th Meeting: Gothenburg, Sweden, Jul. 3, 2019, 4 pages.

Bross et al., "Versatile Video Coding (Draft 5)", Joint Video Experts Team (JVET) of ITU-T SG 16 WP 3 and ISO/IEC JTC 1/SC 29/WG 11, Document: JVET-N1001-v9, 14th Meeting: Geneva, Switzerland, Mar. 19, 2019, 405 pages.

IEEE, "IEEE Standard for Second-Generation IEEE 1857 Video Coding", IEEE Std. 1857.4™-2018, IEEE Standards Association, IEEE Computer Society, 2018,199 pages.

* cited by examiner

| qPi | < 30 | 30 | 31 | 32 | 33 | 34 | 35 | 36 | 37 | 38 | 39 | 40 | 41 | 42 | 43 | > 43 |
|---|---|---|---|---|---|---|---|---|---|---|---|---|---|---|---|---|
| $Qp_C$ | = qPi | 29 | 30 | 31 | 32 | 33 | 33 | 34 | 34 | 35 | 35 | 36 | 36 | 37 | 37 | = qPi − 6 |

FIG. 4

LUMA TO CHROMA QUANTIZATION PARAMETER TABLE SIGNALING

CROSS REFERENCE TO RELATED APPLICATIONS

This application is a U.S. National Stage Application under 35 U.S.C. 371 of International Patent Application No. PCT/EP2020/069407, filed Jul. 9, 2020, which is incorporated herein by reference in its entirety.

This application claims the benefit of European Patent Application Nos. 19305938, filed Jul. 12, 2019, and U.S. Pat. No. 19,306,122, filed Sep. 18, 2019, which are incorporated herein by reference in its entirety.

TECHNICAL FIELD

At least one of the present embodiments generally relates to a method or an apparatus for video encoding or decoding, and more particularly, to a method or an apparatus for signaling a chroma quantization parameter table.

BACKGROUND

Video compression schemes like defined in HEVC and VVC specifications, make use of a quantization parameter QP (or qP) to define the quantization step of a current block to encode and/or to decode. In HEVC for example, a dequantization process is used where coded block frequency-transformed coefficients (TransCoeffLevel) are scaled by the current quantization step (levelScale[qP %6]<<(qP/6)) and further scaled by a quantization matrix m[ ][ ] as follows:

$$d[x][y] = \text{Clip3}(\text{coeffMin}, \text{coeffMax}, ((\text{TransCoeffLevel}[xTbY][yTbY][cIdx][x][y] * m[x][y] * \text{levelScale}[qP \%6] << (qP/6)) + (1 << (bd\text{Shift}-1))) >> bd\text{Shift})$$

Where:
TransCoeffLevel[ . . . ] are the transformed coefficients absolute values for the current block identified by its spatial coordinates xTbY, yTbY and its component index cIdx;
x and y are the horizontal/vertical frequency indices;
qP is the current quantization parameter;
the multiplication by levelScale[qP %6] and left shift by (qP/6) is equivalent to the multiplication by quantization step qStep=(levelScale[qP %6]<<(qP/6));
m[ . . . ][ . . . ] is the two-dimensional quantization matrix;
bdShift is an additional scaling factor to account for image sample bit depth. The term (1<<(bdShift−1)) serves the purpose of rounding to the nearest integer;
d[ . . . ] are the resulting dequantized transformed coefficients absolute values.

A recent addition to high compression technology comprises deriving chroma quantization parameter ($Qp_C$) is derived based on luma Qp using luma-to-chroma Qp mapping table. Such a table may be shared by the encoder and the decoder. However, in some cases, signaling such a table in the data stream instead of having it fixed by a standard may be advantageous. The syntax used to encode, signal and decode this table has a cost in terms of bitrate. Thus, there is a need for a signaling method that takes advantage of video compression schemes in order to limit the required bitrate.

SUMMARY

The present principles relate to a method comprising:
decoding a QP information for luma from a data stream;
obtaining a luma-to-chroma QP mapping table from said data stream;
determining QP information for chroma based on the QP information for luma and said luma-to-chroma QP mapping table; and
decoding a block of an image obtained from the stream using the QP information for luma and the QP information for chroma.

The a QP information for luma may indicate different determinations of the QP information for chroma.

The present principles also relate to a device comprising a processor configured to implement the method above. The present principles also relate to a data stream carrying data representative of an image, a method to encode luma-to-chroma QP mapping table and a QP information for luma indicating how a QP information for chroma is based on the luma-to-chroma QP mapping table for a block of an image. The present principles also relate to a method for encoding such a data stream and to a device comprising a processor configured to implement this method.

DETAILED DESCRIPTION

The general aspects described here are in the field of video compression. These aspects aim at improving compression efficiency compared to existing video compression systems.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 1:
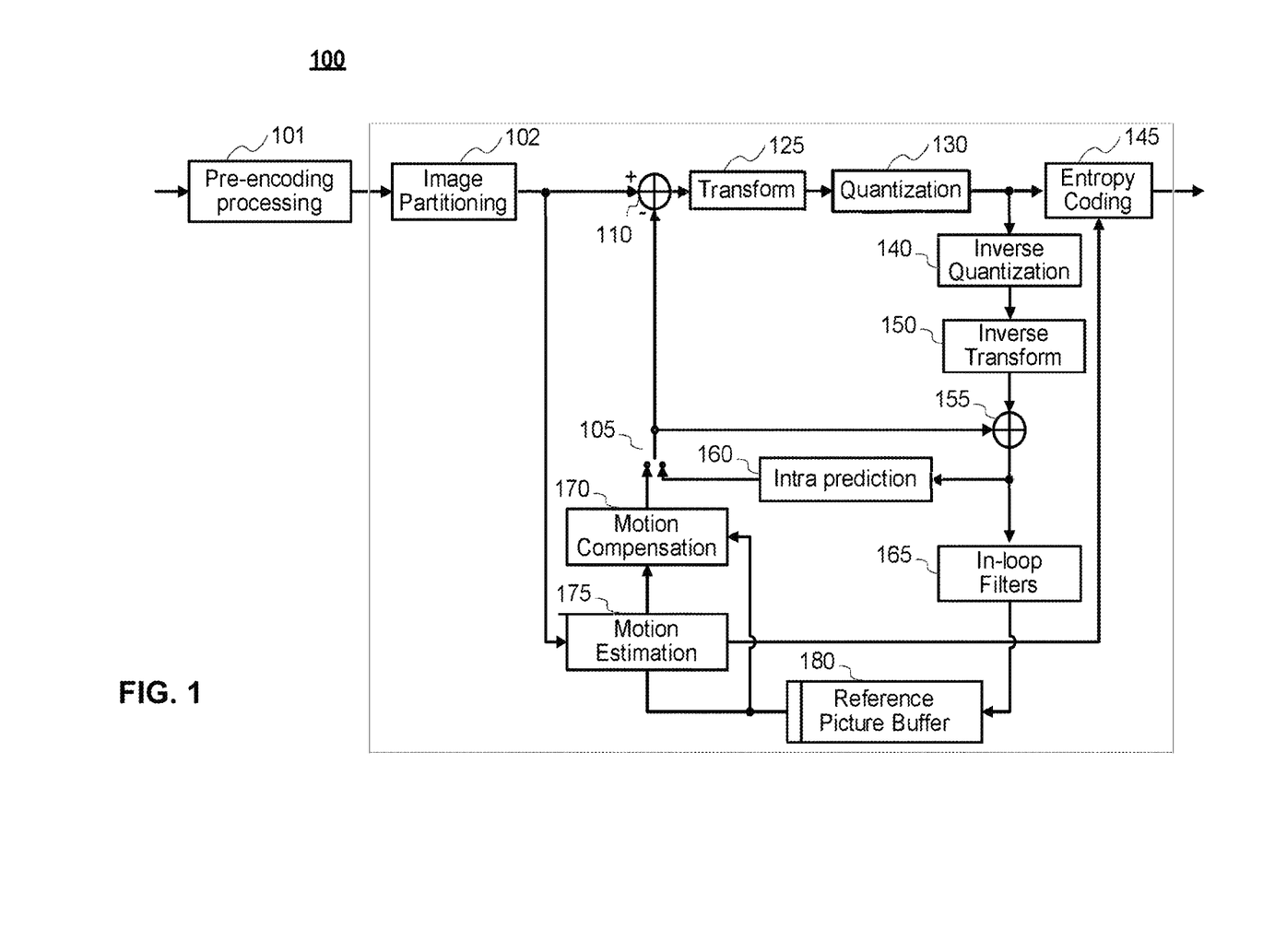
FIG. 1 illustrates an encoder.
Figure 2:
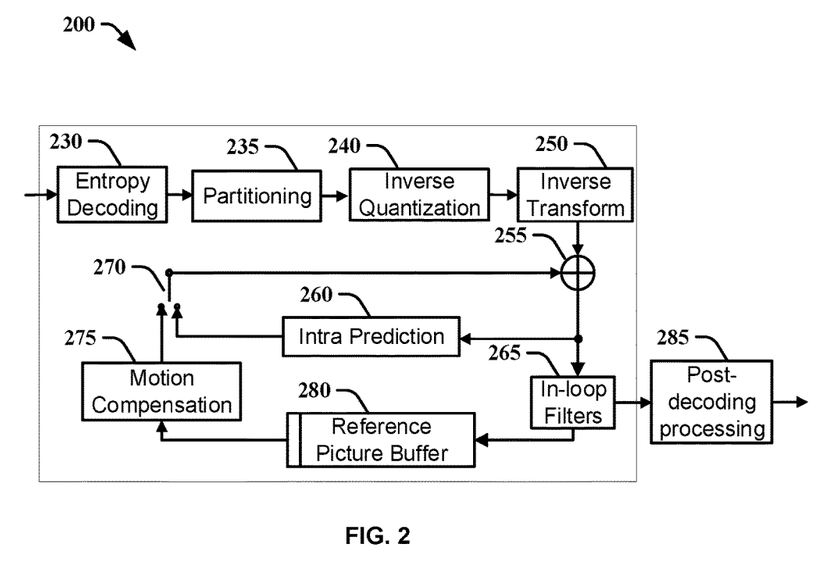
FIG. 2 illustrates a block diagram of a video decoder.
Figure 3:
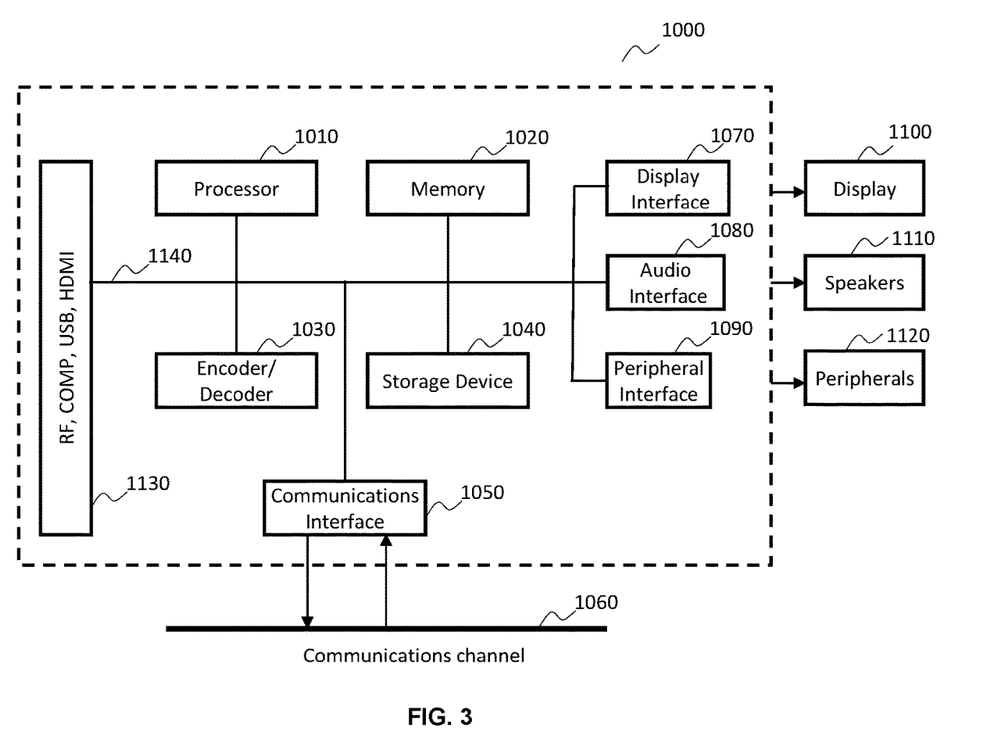
FIG. 3 illustrates a block diagram of an example of a system in which various aspects and embodiments are implemented.

The aspects described and contemplated in this application can be implemented in many different forms. FIGS. 1, 2 and 3 below provide some embodiments, but other embodiments are contemplated and the discussion of FIGS. 1, 2 and 3 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the motion compensation modules 170 and 275, of a video encoder 100 and decoder 200 as shown in FIG. 1 and FIG. 2. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

FIG. 1 illustrates an encoder 100. Variations of this encoder 100 are contemplated, but the encoder 100 is described below for purposes of clarity without describing all expected variations.

Before being encoded, the video sequence may go through pre-encoding processing 101, for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing, and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 2 illustrates a block diagram of a video decoder 200. In the decoder 200, a bitstream is decoded by the decoder elements as described below. Video decoder 200 generally performs a decoding pass reciprocal to the encoding pass as described in FIG. 1. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 3 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 10, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Figure 4:
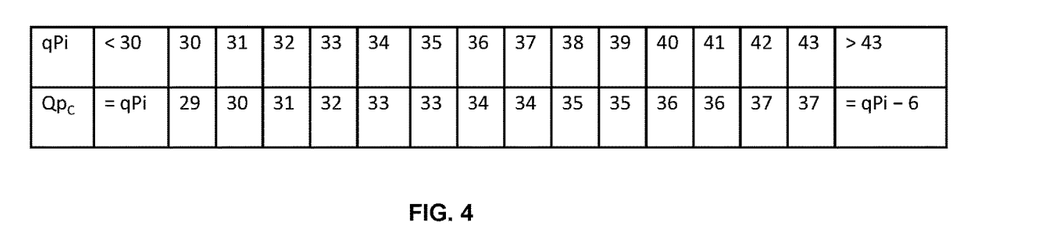
FIG. 4 illustrates an example of luma-to-chroma Qp mapping table.

FIG. 4 illustrates an example of luma-to-chroma Qp mapping table.

For signaling a custom luma-to-chroma Qp mapping table, a possible syntax may be the following:

| | Descriptor |
|---|---|
| sequence_parameter_set( ) { | |
| ... | |
|   same_qp_table_for_chroma | u(1) |
|   for( i = 0; i < same_qp_table_for_chroma ? 1 : 3; i++ ) { | |
|     num_points_in_qp_table_minus1[ i ] | ue(v) |
|     for( j = 0; j <= num_points_in_qp_table_minus1[ i ]; j++ ) { | |
|       delta_qp_in_val_minus1[ i ][ j ] | ue(v) |
|       delta_qp_out_val[ i ][ j ] | ue(v) |
|     } | |
|   } | |
| ... | |
| } | |

The semantics of the different components is the following:

A same_qp_table_for_chroma equal to 1 specifies that only one chroma QP mapping table is signalled and applies to both Cb and Cr components and joint Cb-Cr coding. A same_qp_table_for_chroma equal to 0 specifies that three chroma QP mapping tables are signalled in the SPS.

num_points_in_qp_table_minus1[i] plus 1 specifies the number of points used to describe the chroma QP mapping table. The value of num_points_in_qp_table_minus1[i] shall be in the range of 0 to 63+QpBdOffset$_C$, inclusive.

delta_qp_in_val_minus1[i][j] plus 1 specifies a delta value used to derive the input coordinate of the j-th pivot point of the i-th chroma QP mapping table.

delta_qp_out_val[i][j] specifies a delta value used to derive the output coordinate of the j-th pivot point of the i-th chroma QP mapping table.

The i-th chroma QP mapping tables ChromaQpTable[i] for i=0. same_qp_table_for_chroma?0:2 are derived as follows:

```
qpInVal[ i ][ 0 ] = -QpBdOffset_C + delta_qp_in_val_minus_1[ i ][ 0 ]
qpOutVal[ i ][ 0 ] = -QpBdOffset_C + delta_qp_out_val_[ i ][ 0 ]
for (j = 1; j <= num_points_in_qp_table_minus1[ i ]; j++ ) {
    qpInVal[ i ][ j ] = qpInVal[ i ][ j - 1 ] + delta_qp_in_val_minus1[
    i ][ j ] + 1
    qpOutVal[ i ][ j ] = qpOutVal[ i ][ j - 1 ] + delta_qp_out_val[ i ][
    j ]
}
ChromaQpTable[ i ][ qpInVal[ i ][ 0 ] ] = qpOutVal[ i ][ 0 ]
for( k = qpInVal[ i ][ 0 ] - 1; k >= -QpBdOffset_C; k - - )
    ChromaQpTable[ i ][ k ] = Clip3( -QpBdOffset_C, 63,
    ChromaQpTable[ i ][ k + 1 ] - 1 )
for (j = 0 ; j < num_points_in_qp_table_minus1[ i ]; j++ )
    for( k = qpInVal[ i ][ j ] + 1, m = 1; k <= qpInval[ i ][ j + 1 ]; k++,
    m++ ) {
        sh = ( delta_qp_in_val_minus1[ i ][j + 1 ] + ½ 2 ) >> 1
        ChromaQpTable[ i ][ k ] = ChromaQpTable[ i ][ qpInVal[ i ][ j ] ]
        +
        ( delta_qp_out_val[ i ][j + 1] * m + sh ) / ( delta_qp_in_val_minus1[
        i ][j + 1] + 1 )
    }
```

-continued

```
For (k = qpInVal[ i ][ num_points_in_qp_table_minus1[ i ] ] + 1; k <=
63; k++ )
    ChromaQpTable[ i ][ k ] = Clip3( -QpBdOffset_C, 63, ChromaQpTable[
    i ][ k - 1 ] + 1 )
```

When same_qp_table_for_chroma is equal to 1, ChromaQpTable[1][k] and ChromaQpTable[2][k] are set equal to ChromaQpTable[0][k] for k=−QpBdOffset$_C$ . . . 63.

It is a requirement of bitstream conformance that the values of qpInVal[i][j] and qpOutval[i][j] shall be in the range of −QpBdOffset$_C$ to 63, inclusive for i=0 . . . same_qp_table_for_chroma?0:2 and j=0 . . . num_points_in_qp_table_minus1[i].

According to a first embodiment of the present principles, a syntax is provided for signaling a custom luma-to-chroma Qp mapping table.

In the proposed syntax, the luma QP of the first pivot point of the piecewise linear model is signalled as a difference from a regular QP, for example 26 (as in the case with init_qp_minus26 in the PPS), or another relevant offset, because the luma QP of the first pivot point is expected to fall in the 20 to 30 range, and can be coded as signed integer with smaller absolute value. Such an embodiment of the syntax for signaling luma-to-chroma Qp mapping tables has the advantage to save bits in the datastream. A side-effect is that since only the first point has a luma-QP delta that may be negative, hence a specific syntax must be used for the first point.

Syntax and semantics are:

|  | Descriptor |
|---|---|
| sequence_parameter_set( ) { | |
| ... | |
|   same_qp_table_for_chroma | u(1) |
|   for( i = 0; i < same_qp_table_for_chroma ? 1 : 3; i++ ) { | |
|     num_points_in_qp_table_minus1[ i ] | ue(v) |
|     delta_qp_in_val_minus1[i][ 0 ] | se(v) |
|     delta_qp_out_val[ i ][ 0 ] | ue(v) |
|     for( j = 1; j <= num_points_in_qp_table_minus1[ i ]; j++ ) { | |
|       delta_qp_in_val[ i ][ j ] | ue(v) |
|       delta_qp_out_val[ i ][ j ] | ue(v) |
|     } | |
|   } | |
| ... | |
| } | |

Semantics:

same_qp_table_for_chroma equal to 1 specifies that only one chroma QP mapping table is signalled and applies to both Cb and Cr components and joint Cb-Cr coding. same_qp_table_for_chroma equal to 0 specifies that three chroma QP mapping tables are signalled in the SPS.

num_points_in_qp_table_minus1[i] plus 1 specifies the number of points used to describe the chroma QP mapping table. The value of num_points_in_qp_table_minus1[i] shall be in the range of 0 to 63+QpBdOffset$_C$, inclusive.

delta_qp_in_val_minus1[i][j] specifies a delta value used to derive the input coordinate of the j-th pivot point of the i-th chroma QP mapping table. The value for j equal to zero is offset by 26 and the following are offset by 1.

delta_qp_out_val[i][j] specifies a delta value used to derive the output coordinate of the j-th pivot point of the i-th chroma QP mapping table.

The i-th chroma QP mapping tables ChromaQpTable[i] for 0 . . . same_qp_table_for_chroma?0:2 are derived as follows:

```
qpInVal[ i ][ 0 ] = delta_qp_in_val[ i ][ 0 ] + 26
qpOutVal[ i ][ 0 ] = -QpBdOffset_C + delta_qp_out_val[ i ][ 0 ]
for( j = 1; j <= num_points_in_qp_table_minus1[ i ]; j++ ) {
    qpInVal[ i ][ j ] = qpInVal[ i ][ j - 1 ] + delta_qp_in_val[ i ][ j ] + 1
    qpOutVal[ i ][ j ] = qpOutVal[ i ][ j - 1 ] + delta_qp_out_val_[ i ][ j
    ]
}
ChromaQpTable[ i ][ qpInVal[ i ][ 0 ] ] = qpOutVal[ i ][ 0 ]
for (k = qpInVal[ i ][ 0 ] - 1; k >= -QpBdOffset_C; k - - )
    ChromaQpTable[ i ][ k ] = Clip3( -QpBdOffset_C, 63,
    ChromaQpTable[ i ][ k + 1 ] - 1 )
for (j = 0 ; j < num_points_in_qp_table_minus1[ i ]; j++ )
    for (k = qpInVal[ i ][ j ] + 1, m = 1; k <= qpinval[ i ][ j + 1 ]; k++,
    m++ ) {
        sh = ( delta_qp_in_val [ i ][j + 1 ] + 2 ) >> 1
        chromaQpTable[ i ][ k ] = ChromaQpTable[ i ][ qpInVal[ i ][ j ] ]
        +
        (delta_qp_out_val[ i ][j + 1] * m + sh) / ( delta_qp_in_val [ i ][j +
        1] + 1)
    }
for( k = qpInVal[ i ][ num_points_in_qp_table_minus1[ i ] ] + 1; k <=
63; k++ )
    ChromaQpTable[ i ][ k ] = Clip3( -QpBdOffset_C, 63, ChromaQpTable[
    i ][ k - 1 ] + 1 )
```

When same_qp_table_for_chroma is equal to 1, ChromaQpTable[1][k] and ChromaQpTable[2][k] are set equal to ChromaQpTable[0][k] for k=−QpBdOffset$_C$ . . . 63.

It is a requirement of bitstream conformance that the values of qpInVal[i][j] and qpOutval[i][j] shall be in the range of −QpBdOffset$_C$ to 63, inclusive for i=0 . . . same_qp_table_for_chroma?0:2 and j=0 . . . num_points_in_qp_table_minus1[i].

In this embodiment of the present principles, the location of the luma QP in the first pair is coded as a difference with a given value, just like init_qp_minus26 in PPS, which specifies starting QP for the first slice of a picture. That given value may be 26 or another value like 22 or 28. It is preferred that the given value belongs to interval [20, 30], because the first point is expected to fall in the 20 to 30 range. The QPc table is signaled by a set of (lumaQP,chromaQP) pairs, where in the first pair, lumaQP is coded as a difference from that given value X, where is the same offset as the one used to signal the starting QP of a picture or, for instance a value between 20 and 30, for example, 26. The entropy coding of syntax elements (ue(v), se(v), etc.) is not limitative, nor are names or exact syntax arrangement or semantic description.

In a variant, signaling of the luma to chroma QP difference for the first pair is removed, considering that luma and chroma QP may be identical for the first pair.

According to a second embodiment of the present principles, the chroma QP is expected to follow the luma QP, with a moderate offset. Thus the chromaQP of the set of (lumaQP,chromaQP) pairs that define the piecewise linear model can be signaled as a difference between chroma and luma QPs instead of a raw chroma QP.

An example syntax and semantics is:

|  | Descriptor |
|---|---|
| sequence_parameter_set( ) { | |
| ... | |
|   same_qp_table_for_chroma | u(1) |
|   for( i = 0; i < same_qp_table_for_chroma ? 1 : 3; i++ ) { | |
|     num_points_in_qp_table_minus1[ i ] | ue(v) |
|     for( j = 0; j <= num_points_in_qp_table_minus1[ i ]; | |

-continued

| | Descriptor |
|---|---|
|     j++ ) { | |
|         delta_qp_in_val_minus1[ i ][ j ] | ue(v) |
|         delta_qp_diff_val[ i ][ j ] | ue(v) |
|     } | |
|   } | |
|   ... | |
| } | | same_qp_table_for_chroma equal to 1 specifies that only one chroma QP mapping table is signalled and applies to both Cb and Cr components and joint Cb-Cr coding. same_qp_table_for_chroma equal to 0 specifies that three chroma QP mapping tables are signalled in the SPS.

num_points_in_qp_table_minus1[i] plus 1 specifies the number of points used to describe the chroma QP mapping table. The value of num_points_in_qp_table_minus1[i] shall be in the range of 0 to 63+QpBdOffset$_C$, inclusive.

delta_qp_in_val_minus1[i][j] plus 1 specifies a delta value used to derive the input coordinate of the j-th pivot point of the i-th chroma QP mapping table.

delta_qp_diff_val[i][j] specifies a delta value used to derive the output coordinate of the j-th pivot point of the i-th chroma QP mapping table.

The i-th chroma QP mapping tables ChromaQpTable[i] for i=0 . . . same_qp_table_for_chroma?0:2 are derived as follows:

```
qpInVal[ i ][ 0 ] = delta_qp_in_val_minus1[ i ][ 0 ]
qpOutVal[ i ][ 0 ] = qpInVal[ i ][ 0 ] + delta_qp_diff_val[ i ][ 0 ]
for (j = 1; j <= num_points_in_qp_table_minus1[ i ]; j++ ) {
   qpInVal[ i ][ j ] = qpInVal[ i ][ j – 1 ] + delta_qp_in_val_minus1[ i
][ j ] + 1
   qpOutVal[ i ][ j ] = qpOutVal[ i ][ j – 1 ] +
   delta_qp_in_val_minus1[ i ][ j ] + 1  +
delta_qp_diff_val[ i ][ j ] + bias
}
ChromaQpTable[ i ][ qpInVal[ i ][ 0 ] ] = qpOutVal[ i ][ 0 ]
for (k = qpInVal[ i ][ 0 ] – 1; k >= –QpBdOffset$_C$; k – – )
   ChromaQpTable[ i ][ k ] = Clip3( –QpBdOffset$_C$, 63, ChromaQpTable[
i ][ k + 1 ] – 1 )
for (j = 0 ; j < num_points_in_qp_table_minus1[ i ]; j++ )
   for (k = qpInVal[ i ][ j ] + 1, m = 1; k <= qpInval[ i ][ j + 1 ]; k++,
m++ ) {
      sh = ( delta_qp_in_val_minus1[ i ][j + 1 ] + 2 ) >> 1
      ChromaQpTable[ i ][ k ] = ChromaQpTable[ i ][ qpInVal[ i ][ j ] ] +
((qpOutVal[ i ][  j  +  1]  –  qpOutVal[ i ][ j ]  )  *  m  +  sh)
/
delta_qp_in_val_minus1[ i ][j + 1] + 1 )
}
for( k = qpInVal[ i ][ num_points_in_qp_table_minus1[ i ] ] + 1; k <=
63; k++ )
   ChromaQpTable[ i ][ k ] = Clip3( –QpBdOffset$_C$, 63, ChromaQpTable[
i ][ k – 1 ] + 1 )
```

For example, value bias is set to 0 or to −1.

When same_qp_table_for_chroma is equal to 1, ChromaQpTable[1][k] and ChromaQpTable[2][k] are set equal to ChromaQpTable[0][k] for k=−QpBdOffset$_C$ . . . 63.

It is a requirement of bitstream conformance that the values of qpInVal[i][j] and qpOutval[i][j] shall be in the range of −QpBdOffset$_C$ to 63, inclusive for i=0 . . . same_qp_table_for_chroma?0:2 and j=0 . . . num_points_in_qp_table_minus1[i].

The sign of delta_qp_diff_val may be reversed, with "+delta_qp_diff_val" changed to "−delta_qp_diff_val", resulting in an equivalent method. A table of QP offsets (ChromaQpOffsetTable) could be derived and stored in memory instead of raw chroma QP (ChromaQpTable). If range is limited (both luma QP range, and offset bounds), this can reduce memory needs. In this embodiment, QPc table is signaled by a set of (lumaQP, chromaQPdiff) pairs, where chromaQPdiff is the difference between luma and chroma QP     Each of lumaQP and chromaQPdiff can be coded in dpcm (difference from previous value)

chromaQPdiff can be either lumaQP−chromaQP or chromaQP−lumaQP     chromaQPdiff can be coded with an additional implicit offset (e.g. 1), because it is anticipated to have bias (decreasing chroma QP diff)

According to a third embodiment of the present principles, the first and the second embodiments may be combined. This embodiment has the advantage to cumulate the benefits of coding the first luma QP with a difference and coding chroma QPs as offsets from luma QPs.

The syntax is:

| | Descriptor |
|---|---|
| sequence_parameter_set( ) { | |
|   ... | |
|   same_qp_table_for_chroma | u(1) |
|   for( i = 0; i < same_qp_table_for_chroma ? 1 : 3; i++ ) { | |
|     num_points_in_qp_table_minus1[ i ] | ue(v) |
|     delta_qp_in_val_minus1[ i ][ 0 ] | se(v) |
|     delta_qp_diff_val[ i ][ 0 ] | se(v) |
|     for( j = 1; j <= num_points_in_qp_table_minus1[ i ]; j++ ) { | |
|         delta_qp_in_val[ i ][ j ] | ue(v) |
|         delta_qp_diff_val[ i ][ j ] | se(v) |
|     } | |
|   } | |
|   ... | |
| } | | same_qp_table_for_chroma equal to 1 specifies that only one chroma QP mapping table is signalled and applies to both Cb and Cr components and joint Cb-Cr coding. same_qp_table_for_chroma equal to 0 specifies that three chroma QP mapping tables are signalled in the SPS.

delta_qp_in_val [i][j] specifies a delta value used to derive the input coordinate of the j-th pivot point of the i-th chroma QP mapping table. The value for j equal to zero is offset by 26 and the following are offset by 1.

delta_qp_diff_val[i][j] specifies a delta value used to derive the output coordinate of the j-th pivot point of the i-th chroma QP mapping table.

The i-th chroma QP mapping tables ChromaQpTable[i] for i=0 . . . same_qp_table_for_chroma?0:2 are derived as follows:

```
qpInVal[ i ][ 0 ] = delta_qp_in_val [ i ][ 0 ] + 26
qpOutVal[ i ][ 0 ] = qpInVal[ i ][ 0 ] + delta_qp_diff_val[ i ][ 0 ]
for (j = 1; j <= num_points_in_qp_table_minus1[ i ]; j++ ) {
   qpInVal[ i ][ j ] = qpInVal[ i ][ j – 1 ] + delta_qp_in_val [ i ][ j ] + 1
   qpOutVal[ i ][ j ]  =  qpOutVal[ i ][j – 1 ]  +  delta_qp_in_val
[ i ][ j ] + 1  +
delta_qp_diff_val[ i ][ j ] – 1
}
ChromaQpTable[ i ][ qpInVal[ i ][ 0 ] ] = qpOutVal[ i ][ 0 ]
for (k = qpInVal[ i ][ 0 ] – 1; k >= –QpBdOffset$_C$; k – – )
   ChromaQpTable[ i ][ k ] = Clip3( –QpBdOffset$_C$, 63, ChromaQpTable[
i ][ k + 1 ] – 1 )
for (j = 0 ; j < num_points_in_qp_table_minus1[ i ]; j++ )
   for (k = qpInVal[ i ][ j ] + 1, m = 1; k <= qpInval[ i ][ j + 1 ]; k++,
m++ ) {
      sh = ( delta_qp_in_val [ i ][j + 1 ] + 2 ) >> 1
      ChromaQpTable[ i ][ k ]  =  ChromaQpTable[ i ][ qpInVal[  i  ][
```

```
        j ] ] +
        ((qpOutVal[ i ][ j + 1 ] – qpOutVal[ i ][ j ] ) * m + sh) / (
        delta_qp_in_val [ i ][j + 1] + 1 )
      }
   for (k = qpInVal[ i ][ num_points_in_qp_table_minus1[ i ] ] + 1; k <=
   63; k++ )
      ChromaQpTable[ i ][ k ] = Clip3( –QpBdOffset$_C$, 63, ChromaQpTable[
      i ][ k – 1 ] + 1)
```

When same_qp_table_for_chroma is equal to 1, ChromaQpTable[1][k] and ChromaQpTable[2][k] are set equal to ChromaQpTable[0][k] fork from –QpBdOffset$_C$ to 63. It is a requirement of bitstream conformance that the values of qpInVal[i][j] and qpOutval[i][j] shall be in the range of –QpBdOffset$_C$ to 63, inclusive for i=0 . . . same_qp_table_for_chroma?0:2 and j=0 . . . num_points_in_qp_table_minus1[i].

In a variant, delta_qp_diff_val is renamed delta_qp_diff_val_plus1 to reflect the –1 bias in the computation of qpOutVal.

In another embodiment, it is taken advantage of the fact that the luma and chroma QPs are generally very close for the first pivot point. In a first variant, chroma QP is coded as a difference from luma QP only for the first point; that is that the first pivot point is coded as a difference from (26,26) instead of positive offsets from (–QpBdOffset,–QpBdOffset).

Example syntax and semantics are:

|  | Descriptor |
|---|---|
| sequence_parameter_set( ) { |  |
| ... |  |
|   same_qp_table_for_chroma | u(1) |
|   for( i = 0; i < same_qp_table_for_chroma ? 1 : 3; i++ ) { |  |
|     num_points_in_qp_table_minus1[ i ] | ue(v) |
|     delta_qp_in_val_minus1[ i ][ 0 ] | se(v) |
|     delta_qp_out_val[ i ][ 0 ] | se(v) |
|     for( j = 1; j <= num_points_in_qp_table_minus1[ i ]; j++ ) { |  |
|       delta_qp_in_val_minus1[ i ][ j ] | ue(v) |
|       delta_qp_out_val[ i ][ j ] | ue(v) |
|     } |  |
|   } |  |
| ... |  |
| } |  | same_qp_table_for_chroma equal to 1 specifies that only one chroma QP mapping table is signalled and this table applies to Cb and Cr residuals as well as joint Cb-Cr residuals. same_qp_table_for_chroma equal to 0 specifies that three chroma QP mapping tables are signalled in the SPS. When same_qp_table_for_chroma is not present in the bitstream, the value of same_qp_table_for_chroma is inferred to be equal to 1.

num_points_in_qp_table_minus1[i] plus 1 specifies the number of points used to describe the i-th chroma QP mapping table. The value of num_points_in_qp_table_minus1[i] shall be in the range of 0 to 63+QpBdOffset$_C$, inclusive. When num_points_in_qp_table_minus1[0] is not present in the bitstream, the value of num_points_in_qp_table_minus1[0] is inferred to be equal to 0.

delta_qp_in_val_minus1[i][j] specifies a delta value used to derive the input coordinate of the j-th pivot point of the i-th chroma QP mapping table. When delta_qp_in_val_minus1[0][j] is not present in the bitstream, the value of delta_qp_in_val_minus1[0][j] is inferred to be equal to 0.

delta_qp_out_val[i][j] specifies a delta value used to derive the output coordinate of the j-th pivot point of the i-th chroma QP mapping table. When delta_qp_out_val[0][j] is not present in the bitstream, the value of delta_qp_out_val[0][j] is inferred to be equal to 0.

The i-th chroma QP mapping table ChromaQpTable[i] for i=0 . . . same_qp_table_for_chroma?0:2 is derived as follows:

```
qpInVal[ i ][ 0 ] = delta_qp_in_val_minus1[ i ][ 0 ] + 26
qpOutVal[ i ][ 0 ] = qpInVal[ i ][ 0 ] + delta_qp_out_val[ i ][ 0 ]
for( j = 1; j <= num_points_in_qp_table_minus1[ i ]; j++ ) {
   qpInVal[ i ][ j ] = qpInVal[ i ][ j – 1 ] + delta_qp_in_val_minus1[
   i ][ j ] + 1
   qpOutVal[ i ][ j ] = qpOutVal[ i ][ j – 1 ] + delta_qp_out_val[ i ][
   j ]
}
ChromaQpTable[ i ][ qpInVal[ i ][ 0 ] ] = qpOutVal[ i ][ 0 ]
for( k = qpInVal[ i ][ 0 ] – 1; k >= –QpBdOffset$_C$; k – – )
   ChromaQpTable[i][k] = Clip3( –QpBdOffset$_C$, 63, ChromaQpTable[ i
   ][ k + 1 ]; k++ ) – 1 )
for( j = 0; j < num_points_in_qp_table_minus1[ i ]; j++ ) {
   sh = ( delta_qp_in_val_minus1[ i ][j + 1 ] + 1 ) >> 1
   for( k = qpInVal[ i ][ j ] + 1, m = 1; k <= qpInVal[ i ][ j + 1 ]; k++,
   m++ )
      ChromaQpTable[ i ][ k ] = ChromaQpTable[ i ][ qpInVal[ i ][ j ] ]
      +
   ( delta_qp_out_val[ i ][j + 1] * m + sh ) / ( delta_qp_in_val_minus1[
   i ][j + 1] + 1 )
}
for( k = qpInVal[ i ][ num_points_in_qp_table_minus1[ i ] ] + 1; k <=
63; k++ )
   ChromaQpTable[ i ][ k ] = Clip3( –QpBdOffset$_C$, 63,
   ChromaQpTable[ i ][ k – 1 ]
   + 1)
```

When same_qp_table_for_chroma is equal to 1, ChromaQpTable[1][k] and ChromaQpTable[2][k] are set equal to ChromaQpTable[0][k] for k between –QpBdOffset$_C$ and 63.

It is a requirement of bitstream conformance that the values of qpInVal[i][j] and qpOutVal[i][j] shall be in the range of –QpBdOffset$_C$ to 63, inclusive for i between 0 and if same_qp_table_for_chroma is true then 0, else 2 and j between 0 and num_points_in_qp_table_minus1[i].

It may be noticed that a non-zero luma-chroma QP difference for the first pivot point is redundant with global chroma QP offsets that can be specified by other means (e.g. PPS). Tus, in another embodiment, chroma QP is forced to be equal to luma QP for the first pivot point, thus removing the need to transmit it.

This makes the first pivot point neutral: if alone, it would result in identity QPc table. This requires at least a second pivot point to make the feature useful.

In this embodiment, the list length (number of pivot points in QP table) should be transmitted with an offset of –2 instead of –1, which prevents pointless values and can result in less coding bits. In other words, after the first pivot point position is specified with a single value, the pivot point list length to be transmitted is reduced by one. The pivot point list is an information given in addition to an explicit starting point.

Example syntax and semantics are:

|  | Descriptor |
|---|---|
| sequence_parameter_set( ) { |  |
| ... |  |
|   same_qp_table_for_chroma | u(1) |
|   for( i = 0; i < same_qp_table_for_chroma ? 1 : 3; i++ ) { |  |
|     qp_table_start_minus26[ i ] | se(v) |

-continued

| | Descriptor |
|---|---|
| num_points_in_qp_table_minus1[ i ] | ue(v) |
| for( j = 0; j <= num_points_in_qp_table_minus1[ i ]; j++ ) { | |
| delta_qp_in_val_minus1[ i ][ j ] | ue(v) |
| delta_qp_diff_val[ i ][ j ] | se(v) |
| } | |
| } | |
| ... | |
| } | | same_qp_table_for_chroma equal to 1 specifies that only one chroma QP mapping table is signalled and this table applies to Cb and Cr residuals as well as joint Cb-Cr residuals. same_qp_table_for_chroma equal to 0 specifies that three chroma QP mapping tables are signalled in the SPS. When same_qp_table_for_chroma is not present in the bitstream, the value of same_qp_table_for_chroma is inferred to be equal to 1.

qp_table_start_minus26[i] plus 26 specifies the starting luma and chroma QP used to describe the i-th chroma QP mapping table. The value of start_qp_minus26[i] shall be in the range of $-26-QpBdOffset_C$ to 36 inclusive. When start_qp_minus26[i] is not present in the bitstream, the value of start_qp_minus26[i] is inferred to be equal to 0.

num_points_in_qp_table_minus1[i] plus 1 specifies the number of points used to describe the i-th chroma QP mapping table. The value of num_points_in_qp_table_minus1[i] shall be in the range of 0 to $62+QpBdOffset_C$, inclusive. When num_points_in_qp_table_minus1[0] is not present in the bitstream, the value of num_points_in_qp_table_minus1[0] is inferred to be equal to 0.

delta_qp_in_val_minus1[i][j] specifies a delta value used to derive the input coordinate of the j-th pivot point of the i-th chroma QP mapping table. When delta_qp_in_val_minus1[0][j] is not present in the bitstream, the value of delta_qp_in_val_minus1[0][j] is inferred to be equal to 0.

delta_qp_diff_val[i][j] specifies a delta value used to derive the output coordinate of the j-th pivot point of the i-th chroma QP mapping table. When delta_qp_diff_val[0][j] is not present in the bitstream, the value of delta_qp_diff_val[0][j] is inferred to be equal to 0.

The i-th chroma QP mapping table ChromaQpTable[i], for i from 0 to, if same_qp_table_for_chroma is true then 0, else 2, is derived as follows:

```
qpInVal[ i ][ 0 ] = qp_table_start_minus26[ i ] + 26
qpOutVal[ i ][ 0 ] = qpInVal[ i ][ 0 ]
for( j = 0; j <= num_points_in_qp_table_minus1[ i ]; j++ ) {
  qpInVal[ i ][ j + 1 ] = qpInVal[ i ][ j ] + delta_qp_in_val_minus1[
    i ][ j ] + 1
  qpOutVal[ i ][ j + 1] = qpOutVal[ i ][ j ] + delta_qp_in_val_minus1[
    i ][ j ] +
  delta_qp_diff_val[ i ][ j ]
}
ChromaQpTable[ i ][ qpInVal[ i ][ 0 ] ] = qpOutVal[ i ][ 0 ]
for( k = qpInVal[ i ][ 0 ] - 1; k >= -QpBdOffset_C; k - - )
  ChromaQpTable[ i ][ k ]  =  Clip3( -QpBdOffset_C, 63,
ChromaQpTable[ i ][ k + 1 ] - 1 )
  for( j = 0; j <= num_points_in_qp_table_minus1[ i ]; j++ ) {
    sh = ( delta_qp_in_val_minus1[ i ][ j ] + 1 ) >> 1
    for( k = qpInVal[ i ][ j ] + 1, m = 1; k <= qpInVal[ i ][ j + 1 ]; k++,
    m++)
      ChromaQpTable[ i ][ k ] = ChromaQpTable[ i ][ qpInVal[ i ][ j ] ]
      +( ( qpOutVal[ i ][j  +  1  ] - qpOutVal[ i ][ j ]  )  *  m
      +  sh  )  /
      ( delta_qp_in_val_minus1[ i ][ j ] + 1 )
}
```

```
for( k = qpInVal[ i ][ num_points_in_qp_table_minus1[ i ] + 1 ] +
1; k <= 63; k++ )
  ChromaQpTable[ i ][ k ] = Clip3( -QpBdOffset_C, 63,
  ChromaQpTable[ i ][ k - 1 ] + 1)
```

When same_qp_table_for_chroma is equal to 1, ChromaQpTable[1][k] and ChromaQpTable[2][k] are set equal to ChromaQpTable[0][k] for k between $-QpBdOffset_C$ and 63.

It is a requirement of bitstream conformance that the values of qpInVal[i][j] and qpOutVal[i][j] shall be in the range of $-QpBdOffset_C$ to 63, inclusive for i=0 . . . same_qp_table_for_chroma?0:2 and j=0 . . . num_points_in_qp_table_minus1[i]+1.

Various implementations involve decoding. "Decoding", as used in this application, can encompass all or part of the processes performed, for example, on a received encoded sequence in order to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application, for example, retrieving chroma quantization parameters used by modules 240 of FIG. 2.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application, for example, signaling and processing chroma quantization parameters used by modules 130 and 140 of FIG. 1.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein, are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of parameters for determining second information data from sub-block mode encoded blocks. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:
1. A method comprising:
decoding a QP information for luma from a data stream;
obtaining a first luma-to-chroma QP mapping table from the data stream;
determining a second luma-to-chroma QP mapping table wherein the chroma value is an addition between a chroma value in the first luma-to-chroma QP mapping table and a corresponding luma value in the first luma-to-chroma QP mapping table; and
decoding a block of an image obtained from the stream using the second luma-to-chroma QP mapping table.

2. The method of claim 1, wherein the QP information for luma indicates that the luma QP value at a position in the first luma-to-chroma QP mapping table corresponds to a first pivot point of a piecewise linear model is a difference from a regular QP.

3. The method of claim 1, wherein the QP information for luma of the first luma-to-chroma QP mapping table indicates that the QP information for chroma is coded as a difference from luma value only for a first pivot point.

4. A non-transitory computer readable storage medium storing instructions, which, when executed by one or more processors, perform the method of claim 1.

5. A device comprising a processor configured for:
decoding a QP information for luma from a data stream;

obtaining a first luma-to-chroma QP mapping table from the data stream;

determining a second luma-to-chroma QP mapping table wherein the chroma value is an addition between a chroma value in the first luma-to-chroma QP mapping table and a corresponding luma value in the first luma-to-chroma QP mapping table; and decoding a block of an image obtained from the stream using the second luma-to-chroma QP mapping table.

6. The device of claim 5, wherein the QP information for luma indicates that the luma QP value at a position in the first luma-to-chroma QP mapping table corresponds to a first pivot point of a piecewise linear model is a difference from a regular QP.

7. The device of claim 5, wherein the QP information for luma of the first luma-to-chroma QP mapping table indicates that the QP information for chroma is coded as a difference from luma value only for a first pivot point.

8. A method comprising:

obtaining a first luma-to-chroma QP mapping table;

determining a second luma-to-chroma QP mapping table wherein the chroma value is a difference between a chroma value in the first luma-to-chroma QP mapping table and a corresponding luma value in the first luma-to-chroma QP mapping table; and encoding, in a data stream, a block of an image and the second luma-to-chroma QP mapping table.

9. The method of claim 8, wherein the QP information for luma indicates that the luma QP value at a position in the second luma-to-chroma QP mapping table corresponds to a first pivot point of a piecewise linear model is a difference from a regular QP.

10. The method of claim 8, wherein the QP information for luma of the second luma-to-chroma QP mapping table indicates that the QP information for chroma is coded as a difference from luma value only for a first pivot point.

11. A non-transitory computer readable storage medium storing instructions, which, when executed by one or more processors, perform the method of claim 8.

12. A device comprising a processor configured for:

obtaining a first luma-to-chroma QP mapping table;

determining a second luma-to-chroma QP mapping table wherein the chroma value is a difference between a chroma value in the first luma-to-chroma QP mapping table and a corresponding luma value in the first luma-to-chroma QP mapping table; and encoding, in a data stream, a block of an image and the second luma-to-chroma QP mapping table.

13. The device of claim 12, wherein the QP information for luma indicates that the luma QP value at a position in the second luma-to-chroma QP mapping table corresponds to a first pivot point of a piecewise linear model is a difference from a regular QP.

14. The device of claim 12, wherein the QP information for luma of the second luma-to-chroma QP mapping table indicates that the QP information for chroma is coded as a difference from luma value only for a first pivot point.

* * * * *